May 30, 1950     H. L. KRAEFT ET AL     2,509,567
VELOCIPEDE FRAME HEAD CONSTRUCTION

Filed July 27, 1946     2 Sheets-Sheet 1

INVENTORS.
HERMAN L. KRAEFT, &
LEONARD J. WALTERS.
BY Fay, Dolnick & Fay
Attorneys.

May 30, 1950  H. L. KRAEFT ET AL  2,509,567
VELOCIPEDE FRAME HEAD CONSTRUCTION
Filed July 27, 1946  2 Sheets-Sheet 2
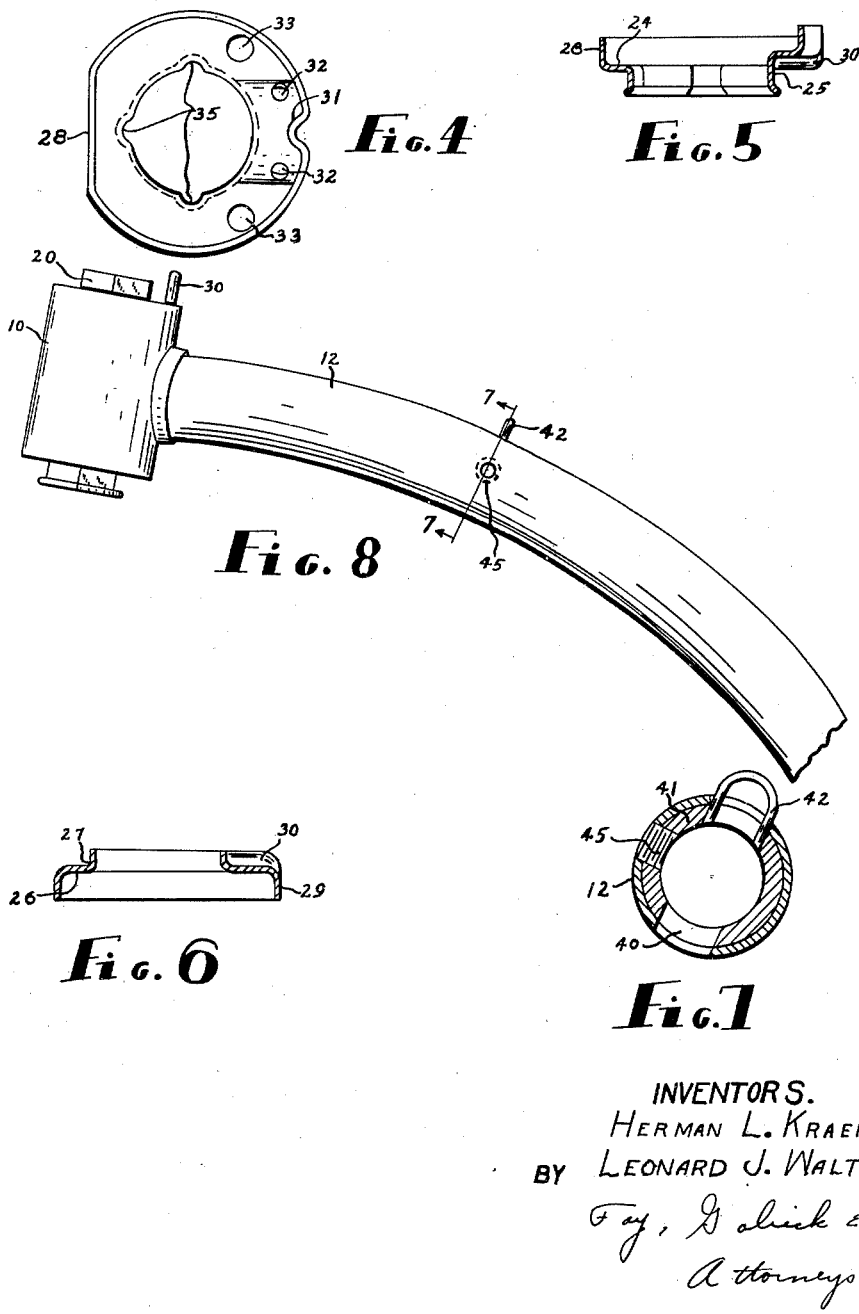
INVENTORS.
HERMAN L. KRAEFT. &
BY LEONARD J. WALTERS.
Fay, Oberlick & Fay
Attorneys.

Patented May 30, 1950

2,509,567

UNITED STATES PATENT OFFICE 2,509,567

VELOCIPEDE FRAME HEAD CONSTRUCTION

Herman L. Kraeft, Cleveland Heights, and Leonard J. Walters, Shaker Heights, Ohio, assignors to The Murray-Ohio Manufacturing Company, Cleveland, Ohio, a corporation of Ohio Application July 27, 1946, Serial No. 686,628

7 Claims. (Cl. 287—54)

This invention is directed to improvements in velocipede frames and the general object thereof is the provision of a strong head and backbone tube connecting structure so contrived as to be adaptable to the simultaneous copper brazing of all of the seams, joints and contacting surfaces of the parts comprising the head and backbone tube connection assembly.

Another object of the present invention is to provide a backbone tube and head connection structure in which the end of the backbone tube will be joined to an outer head tube and a spaced inner fork bearing tube in such manner that the load transmitted from the backbone to the head structure will be distributed to both tubes.

A still further object of the present invention is to provide a velocipede frame head and backbone tube connection which will fulfill the foregoing purposes in an economical manner and which will have a neat, attractive appearance.

Other objects and advantages of the invention will be apparent from the following description of a preferred form of embodiment of the invention, reference being made to the accompanying drawings wherein:

Fig. 4 is a plan view of one of the spacing members of the structure shown in Fig. 2;

Fig. 5 is a side view of the spacing member shown in Fig. 4;

Fig. 6 is a cross-sectional view of the other spacing member of the Fig. 2 structure; and Fig. 7 is a cross-sectional view along the line 7—7 taken through the opening in the backbone for the reception of the seat post.

Figure 1:
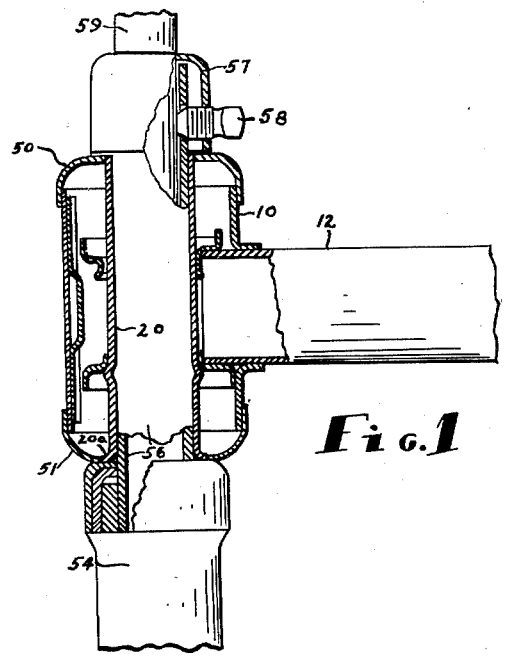
Fig. 1 is a side elevation of the head and part of the backbone of a velocipede frame incorporating the features of my invention.

Our invention contemplates the provision of a head structure and backbone tube connection for a velocipede frame comprising essentially an outer relatively large head tube, an inner fork bearing tube and spacing members disposed between the walls of the two tubular members. The structures of these members are such that they may be formed of sheet metal by stamping and forming operations and be of such design as to facilitate ready pre-assembling and to facilitate the effecting of high quality brazed joining of the respective members to each other and to a substantial length of the upper end portion of the backbone tube. The resulting structure is such that the pre-assembly is stable for handling purposes and during the brazing period the inner spaces are properly vented to prevent the formation of gas pockets duing a copper brazing operation and during which the flowing action of the liquid copper to the joining surfaces is facilitated by the guiding effect of the shape of the parts.

In the drawings we show a comparatively large outer or head tube 10, preferably formed of sheet metal stock, with a branch 11 having a close fitting opening relative to the circumferential surface of the end portion of a backbone tube 12. The head tube 10 has a longitudinal seam at the forward side thereof, that is, 180° from the branch formation 11. This seam is reinforced by a sheet metal strip 13 which, during the pre-assembly, is secured by light spot welding to the inner face of the head tube wall. The strip 13 is provided with a pocket formation 14 to receive and to maintain a wire section 15 disposed in immediate relation to the longitudinal seam of the head tube.

A fork bearing tube 20 of considerably smaller diameter than the head tube 10 is formed of sheet metal to have a shoulder 21 struck out from the wall thereof and is of such length as to project above and below the top and bottom of the head tube 10 for a purpose to be described. The bearing tube 20 has a longitudinal seam, preferably disposed 90° from the seam of the head tube 10. An upper spacing member 24 and a lower spacing member 26 surround the fork bearing tube 20 and engage the inner face of the wall of the head tube 10 to space the two tubes.

Figure 2:
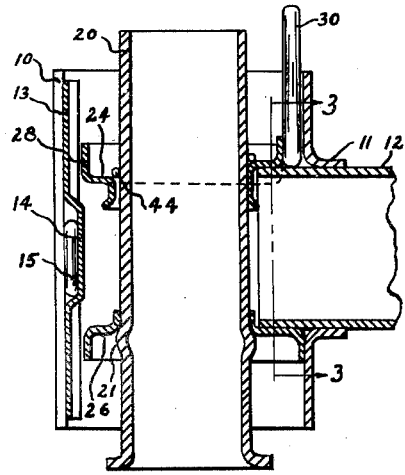
Fig. 2 is a cross-sectional elevation taken vertically through the head and backbone structure.
Figure 3:
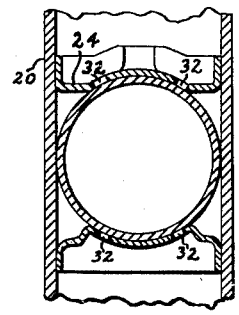
Fig. 3 is a cross-sectional view taken substantially along the line 3—3 of Fig. 2.

It will be noted in Fig. 2 that the spacing members 24 and 26 are spaced axially along the two tubes a distance slightly less than the diameter of the backbone tube 12. Referring to Figs. 5 and 6, which respectively show the upper spacing member 24 and the lower spacing member 26, it will be noted that these spacing members are provided with inner flange formations 25 and 27 and outer flange formations 28 and 29 which are so dimensioned as to tightly embrace the outer surface of the fork bearing tube 20 and the inner wall surface of the housing tube 10 respectively. These spacing members are also provided with arcuate seats 30 which conform in contour to the circumferential surface of the end of the backbone tube 12 and, as shown in Figs. 2 and 3, serve as bearing pads for the inner end portion of the backbone tube 12 and thus considerably increase the brazed area and extent of connection of the backbone tube end 12 and the general head structure. Thus, both the inner fork bearing tube 20 and outer head tube 10 become connected ultimately by the copper brazing operation to the backbone 12. It will be obvious that in some velocipede frame constructions the branch formation 11 could be omitted.

Particular attention has been given to the structure whereby venting of the two spaces within the head structure will be assured during the brazing operation and also to the directing of the flow of the liquid copper to the desired surfaces to be brazed. In addition the spreading of the copper through the capillary action to be expected has also received study. It will be noted that we have provided an indented formation 31, note Fig. 4, in the flange 28 of the upper spacing member 24 which, when the parts are assembled, completes the formation of a pocket bounded by indentation 31 at one side, the inner face of the head tube 10 at the other side and the surface of the backbone tube end 12 for the reception of a copper wire slug 30. The spacing member 24 is provided with two small openings 32 disposed to penetrate the seat formation of the spacing member 24. Like openings 32 are provided in the lower spacing member 26. We also provide two larger openings 33, see Fig. 4, in the horizontal wall of the spacing member 24 to prevent the formation of dead air spaces within the head tube adjacent the inner end of the backbone tube. We also provide three groove formations 35 in the flange 25 of the upper spacing member 24 for venting purposes and for copper flow. It will also be noted that the outer flanges 28 which contact the inner face of the head tube 10 are provided with flat formations opposite the longitudinal seam strip 13, thus providing a major venting passageway through the head structure immediately adjacent the head tube seam reinforcing strip 13.

In Fig. 7 it will be noted that the backbone tube, at the seat post opening 40, is provided with an inner reinforcing tube 41, considerably greater in cross-section than the backbone tube 12. A U-shaped copper wire section 42 is inserted in the upper reach of the seat post opening 40.

To complete the structure, the copper slug 30 of predetermined volume is positioned in the pocket formation as shown in Fig. 2. The copper wire section 15 is entrapped at the time the reinforcing strip 13 is spot welded in the position shown in Fig. 2. A ring of copper wire 44 is supported by the upper spacing member 24 immediately adjacent the circumferential surface fork bearing tube 20. The pre-assembly is thus prepared for introduction in the brazing furnace.

The assembly is then placed in a non-oxidizing copper brazing furnace and, when the proper heat is attained to liquify the copper slugs, the liquid copper from slug 30 will flow between the inner surface of the head tube branch 11 and the outer surface of the backbone tube, and also between the seat formations of the spacing members relative to the backbone tube end. The copper will flow between the flanges 28 and the inner face of the head tube 10. The copper from ring 44 will flow downwardly between the surface of the fork bearing tube 20 and the inner flanges 25 and 27 of the spacing members and upwardly and downwardly along the longitudinal seam of the bearing tube 20. The copper from the slug 15 will flow upwardly and downwardly along the longitudinal seam of the head tube 10 upwardly, primarily by capillary attraction. The copper lug 42, when liquified, will flow between the circumferential surface of the reinforcing tube 41 and the inner surface of the backbone tube 12 at the seat post mounting. An opening 45, extending through backbone tube 12 and reinforcing tube 41, may then be threaded to receive a clamping bolt for locking the seat post.

In the ultimate velocipede assembly as shown in Fig. 1, it will be seen that the projecting ends of the fork bearing tube serve to protect and stabilize cup-shaped closure caps 50 and 51, usually bright plated for ornamental purposes; and which are tightly fitted on the circumferential end surfaces of the housing or head tube 10. Front fork 54 has the steering tube 56 thereof held in assembled position by a locking cap and clamp screw 58 which clamps the handle bar post 59 to the fork tube 56. The main load thus is taken by the lower flange 20ª of the fork bearing tube. It will be apparent that if desired the lower end of the fork bearing tube 20 can be flat or cup-shaped to cooperate with a ball bearing or disk bearing. It also is obvious that the upper end of the fork bearing tube could be adapted to support a radial bearing.

It will be seen that the disclosed construction, while resulting in an attractive head structure for a velocipede frame of more than usual sturdiness, has such physical characteristics as to be readily and economically pre-assembled and remain so during subsequent handling and throughout the metal expanding period of the copper brazing operation.

We claim:

1. In a velocipede frame of the tricycle type, a head structure comprising an outer tube, an inner fork bearing tube spaced from the outer tube, flanged spacing members disposed between the two tubes with the flanges thereof in brazed relation to the outer surface of the fork tube and the inner surface of the head tube and a single backbone tube end extending through an opening formed in the wall of the head tube and terminating between the head tube and fork bearing tube and said spacing members being disposed to engage and being brazed to the said end portion of the backbone tube.

2. In a velocipede frame of the tricycle type, a head structure comprising an outer tube, an inner fork bearing tube spaced from the outer tube, spacing members disposed between the two tubes in brazed relation to the outer surface of the fork bearing tube and the inner surface of the head tube, the head tube having a single opening for the reception of the end of a single backbone tube end, a backbone tube end extending through said opening in the head tube and terminating between the head tube and fork bearing tube and each of said spacing members being shaped to conform to a part of the said end portion of the backbone tube and brazed to said end portion.

3. In a tricycle frame of the single backbone tube type, a head structure comprising a stamped outer tube having a backbone tube receiving opening formed thereon, a stamped inner fork bearing tube spaced from the outer tube and having a shoulder formed thereon, flanged spacing members disposed between the two tubes with the flanges thereof in close fitting relation to the outer surface of the fork bearing tube and the inner surface of the head tube and, one of the spacing members resting upon said shoulder, a backbone tube and extending through the wall opening of the head tube and terminating between the outer tube and fork bearing tube, said spacing members being disposed to engage the said end portion of the backbone tube and to reinforce the bearing tube, said spacing members being bonded to said outer and inner tubes and to said end portion of the backbone tube.

4. In a velocipede frame, a head and backbone tube connection structure comprising a comparatively large outer head tube formed of sheet metal to have a backbone receiving opening formed in the wall thereof and a longitudinal seam, a fork bearing tube formed to have a longitudinal seam and disposed within the head tube and spaced from the wall of the head tube, spacing members having flanges connected to the inner surface of the head tube and embracing the outer surface of the bearing tube, a backbone tube and extending through the wall opening of the head tube and terminating between the head tube and bearing tube and in proximity to the bearing tube and said spacing members being disposed to engage the inner end of the backbone tube, an inner seam spanning member secured to said head tube and reinforcing the longitudinal seam thereof and said spacing members being shaped to be out of contact with the seam spanning member while serving to align the tube members.

5. In a velocipede frame, a head and backbone tube connection structure comprising a pressed metal outer tube and a pressed metal inner fork bearing tube, the outer tube being of comparatively large diameter relative to the diameter of the inner bearing tube, a centrally located opening formed in the outer tube wall for the reception of the end of a backbone tube, said tubular members having longitudinal seams, a pair of stamped flange members within the head tube in engagement with the respective wall surfaces of the tubes and spaced apart a distance substantially the diameter of the backbone tube end, a backbone tube end extending through the opening to engage the spacing members, means disposed along the inner surface of the head tube for reinforcing the head tube seam and all of said members being brazed together to form a unitary structure.

6. In a tricycle frame of the single backbone type, a head and backbone tube structure comprising a comparatively large outer head tube formed of sheet metal and having a backbone receiving opening formed centrally in the wall thereof, a fork bearing tube formed to have a longitudinal seam and disposed within the head tube and spaced from the wall of the head tube, the bearing tube being longer than the head tube to project above the top and below the bottom of the head tube ends, spacing members connected to the inner surface of the head tube and connected to the outer surface of the bearing tube, a backbone tube end extending through the centrally located wall opening of the head tube and terminating between the head tube and fork bearing tube in proximity to the bearing tube and said spacing members being connected to the inner end of the backbone tube to thereby connect the backbone tube end to the inner bearing tube.

7. In a tricycle frame of the single backbone type, a head and backbone tube connecting structure comprising a pressed metal outer tube and a pressed metal inner fork bearing tube, the outer tube being of comparatively large diameter relative to the diameter of the inner bearing tube and the length of the inner tube being greater than that of the outer tube, an outwardly exposed opening formed in the outer tube wall for the reception of the end of a backbone tube, a backbone tube end extending through the opening and terminating between the outer tube and the inner tube wall, a pair of stamped flange members within the head tube connected to the respective wall surfaces of the tubes and spaced apart a distance substantially the diameter of the backbone tube end and secured thereto and said head and bearing tubes having longitudinal seams, a seam spanning member spanning the longitudinal seam of the head tube interiorly thereof and extending from a point below one of the flange members to a position above the other flange member.

HERMAN L. KRAEFT.
LEONARD J. WALTERS.

REFERENCES CITED

The following references are of record in the file of this patent:

UNITED STATES PATENTS

| Number | Name | Date |
| --- | --- | --- |
| 554,465 | Tomlinson | Feb. 11, 1896 |
| 571,289 | Shultz | Nov. 10, 1896 |
| 616,073 | Brennan | Dec. 20, 1898 |
| 736,527 | Latta | Aug. 18, 1903 |
| 1,543,497 | Emmet | June 23, 1925 |
| 2,310,064 | Conti | Feb. 2, 1943 |
| 2,333,642 | Dempsey | Nov. 9, 1943 |
| 2,443,008 | Kraeft et al. | June 8, 1948 |

FOREIGN PATENTS

| Number | Country | Date |
| --- | --- | --- |
| 16,526 | Great Britain | July 25, 1896 |
| 29,725 | Great Britain | Dec. 24, 1896 |
| 513,406 | Germany | Nov. 2, 1928 |
| 265,791 | Italy | June 6, 1929 |